(12) United States Patent
Liu et al.

(10) Patent No.: US 9,909,893 B2
(45) Date of Patent: Mar. 6, 2018

(54) INTELLIGENT BLIND GUIDING DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongjuan Liu, Beijing (CN); Haisheng Wang, Beijing (CN); Yingming Liu, Beijing (CN); Shengji Yang, Beijing (CN); Weijie Zhao, Beijing (CN); Wei Liu, Beijing (CN); Changfeng Li, Beijing (CN); Xiaoliang Ding, Beijing (CN); Rui Xu, Beijing (CN); Lei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/082,893

(22) Filed: Mar. 28, 2016

(65) Prior Publication Data

US 2017/0067754 A1   Mar. 9, 2017

(30) Foreign Application Priority Data

Sep. 6, 2015   (CN) .......................... 2015 1 0561433

(51) Int. Cl.
*G01C 21/36*   (2006.01)
*H04W 4/02*   (2018.01)
(Continued)

(52) U.S. Cl.
CPC .......... *G01C 21/3608* (2013.01); *A61H 3/06* (2013.01); *G08G 1/005* (2013.01); *G08G 1/123* (2013.01);
(Continued)

(58) Field of Classification Search
CPC ............ G01C 21/3407; G01C 21/3608; G08G 1/123; H04W 4/02
See application file for complete search history.

(56) References Cited

U.S. PATENT DOCUMENTS

| | | | |
|---|---|---|---|
| 2005/0187678 A1 | 8/2005 | Myeong et al. | |
| 2013/0013314 A1* | 1/2013 | Boschker | ................ G10L 13/00 704/260 |

(Continued)

FOREIGN PATENT DOCUMENTS

| | | |
|---|---|---|
| CN | 201251445 Y | 6/2009 |
| CN | 103462786 A | 12/2013 |

(Continued)

OTHER PUBLICATIONS

First Chinese Office Action, for Chinese Patent Application No. 2015105614339, dated Sep. 12, 2016, 16 pages.
(Continued)

*Primary Examiner* — Michael D Lang
(74) *Attorney, Agent, or Firm* — Kinney & Lange, P.A.

(57) ABSTRACT

The present disclosure provides an intelligent blind guiding device, wherein a satellite positioning module is configured to acquire a location information representative of a user's location; an ultrasonic module is configured to acquire an obstacle information by detecting surrounding obstacles; a positioning analysis module is configured to acquire a revised location information; a voice input module is configured to acquire a destination information; a central processing unit is configured to determine a travel solution; and
(Continued)

a prompt module is configured to broadcast the travel solution. The present disclosure may realize a precise positioning, and provide an optional travel mode for a blind person.

18 Claims, 3 Drawing Sheets

(51) Int. Cl.
    *G08G 1/123*     (2006.01)
    *A61H 3/06*     (2006.01)
    *G08G 1/005*     (2006.01)
    *G08G 1/00*     (2006.01)
    *G01C 21/34*     (2006.01)

(52) U.S. Cl.
    CPC .............. *G08G 1/202* (2013.01); *H04W 4/02* (2013.01); *A61H 2201/1604* (2013.01); *A61H 2201/165* (2013.01); *A61H 2201/5048* (2013.01); *A61H 2201/5097* (2013.01); *G01C 21/3407* (2013.01)

(56) References Cited

U.S. PATENT DOCUMENTS

| | | | |
|---|---|---|---|
| 2014/0266571 A1* | 9/2014 | Sharma | ................ G09B 21/003 340/4.12 |
| 2015/0254943 A1* | 9/2015 | Daeef | ...................... G08B 3/10 340/539.11 |

FOREIGN PATENT DOCUMENTS

| | | |
|---|---|---|
| CN | 103637900 A | 3/2014 |
| CN | 104127302 A | 11/2014 |
| JP | H0866441 A | 3/1996 |

OTHER PUBLICATIONS

Second Chinese Office Action, for Chinese Patent Application No. 201510561433.9, dated Mar. 28, 2017, 18 pages.

* cited by examiner

INTELLIGENT BLIND GUIDING DEVICE

CROSS-REFERENCE TO RELATED APPLICATION

This application claims the benefit of Chinese Patent Application No. 201510561433.9 filed on Sep. 06, 2015 in the State Intellectual Property Office of China, the whole disclosure of which is incorporated herein by reference.

BACKGROUND OF THE INVENTION

Field of the Invention

Embodiments of the present disclosure relate to a technical field of intelligent positioning, in particular, to an intelligent blind guiding device.

Description of the Related Art

As the technology has progressed continuously, more and more intelligent electronic devices go into people's life to greatly facilitate their living, especially in the field of some special populations.

At present, there have been more difficulties in walk guiding for a blind person, a blind cane and a seeing-eye dog are mainly auxiliary tools for assisting the blind person's travel. However, it is necessary for the seeing-eye dog to be trained for a long time, and it is costly and hard to feed the seeing-eye dog. Although the blind cane has advantages of convenience and low cost, it provides a small detection range, therefore, it is difficult to timely detect an obstacle located above one's chest. In addition, as compared to an easy environment such as blind walk way, sidewalk, or the like, it is more difficult and dangerous for the blind person to travel only by means of the blind cane in a traffic light cross-road intersection, human vehicle hybrid road and environment without traffic identifier.

Currently, many technical inventions regarding blind guiding apparatuses have been known. Such apparatuses measure a distance between a blind person and an obstacle by ultrasonic, however, it only functions to prevent the blind person from running onto the obstacle, thereby the function is too simple, and the practicability is very limited. Furthermore, the prior art cannot position precisely, further cannot direct the blind person to travel with public traffic or taxi.

SUMMARY OF THE INVENTION

The embodiments of the present disclosure provide an intelligent blind guiding device, which may realize a precise positioning, and provide an optional travel mode for a blind person.

In a first aspect, the present disclosure provides an intelligent blind guiding device, comprising a satellite positioning module, an ultrasonic module, a positioning analysis module, a central processing unit, a prompt module and a voice input module;

wherein the satellite positioning module is configured to acquire a location information representative of a user's location; the ultrasonic module is configured to acquire an obstacle information by detecting surrounding obstacles; and the positioning analysis module is configured to acquire a revised location information according to the location information, the obstacle information and a three-dimensional map stored therein; and wherein the voice input module is configured to acquire a destination information according to an inputted voice; the central processing unit is configured to determine a travel solution according to the revised location information and the destination information; and the prompt module is configured to broadcast the travel solution.

Optionally, the device further comprises a public traffic information module;

wherein the public traffic information module is configured to acquire an arrival information of a public traffic; and wherein the central processing unit is configured to determine a public traffic travel solution according to the revised location information, the destination information and the arrival information of the public traffic.

Optionally, the public traffic comprises a bus and a subway.

Optionally, the device further comprises a taxi information module;

wherein the taxi information module is configured to acquire a taxi information within a preset range; and wherein the central processing unit is configured to generate a request for taking a taxi and send the request to taxies within the preset range according to the revised location information, the destination information and the taxi information.

Optionally, the device further comprises a wireless communication module;

wherein the wireless communication module is configured to acquire an updated map information and send the map information to the central processing unit.

Optionally, the device further comprises a traffic status information module;

wherein the traffic status information module is configured to acquire a real-time traffic status information and send the traffic status information to the central processing unit; and wherein the central processing unit is configured to determine a travel route for the user according to the map information and the traffic status information.

Optionally, the prompt module is further configured to prompt the user before encountering an obstacle.

Optionally, the device further comprises a conversation module;

wherein the conversation module is configured to provide a wireless telephone function.

Optionally, the ultrasonic module comprises an ultrasonic emitter and an ultrasonic receiver.

Optionally, the intelligent blind guiding device comprises a hat;

wherein the ultrasonic module is provided on the hat; and one ultrasonic emitter and one ultrasonic receiver are provided on the hat in each of four directions, each two adjacent directions of which being spaced apart from each other by 90 degrees.

Optionally, the intelligent blind guiding device further comprises a controller;

wherein the satellite positioning module, the positioning analysis module, the central processing unit, the prompt module and the voice input module are each provided on the controller.

Optionally, the controller is provided with an on-off key and a walk key;

wherein the on-off key is configured to switch on or switch off the intelligent blind guiding device; and the walk key is configured to select a walking travel mode.

Optionally, the intelligent blind guiding device further comprises a controller;

wherein the satellite positioning module, the positioning analysis module, the central processing unit, the prompt module, the voice input module and the public traffic information module are each provided on the controller.

Optionally, the intelligent blind guiding device further comprises a controller;

wherein the satellite positioning module, the positioning analysis module, the central processing unit, the prompt module, the voice input module and the taxi information module are each provided on the controller.

Optionally, the intelligent blind guiding device further comprises a controller;

wherein the satellite positioning module, the positioning analysis module, the central processing unit, the prompt module, the voice input module and the wireless communication module are each provided on the controller.

Optionally, the intelligent blind guiding device further comprises a controller;

wherein the satellite positioning module, the positioning analysis module, the central processing unit, the prompt module, the voice input module, the wireless communication module and the traffic status information module are each provided on the controller.

Optionally, the intelligent blind guiding device further comprises a controller;

wherein the satellite positioning module, the positioning analysis module, the central processing unit, the prompt module, the voice input module and the conversation module are each provided on the controller.

Optionally, the controller is provided with an on-off key, a walk key and a public traffic key;

wherein the on-off key is configured to switch on or switch off the intelligent blind guiding device; the walk key is configured to select a walking travel mode; and the public traffic key is configured to select a public traffic travel mode.

Optionally, the controller is provided with an on-off key, a walk key and a taxi key;

wherein the on-off key is configured to switch on or switch off the intelligent blind guiding device; the walk key is configured to select a walking travel mode; and the taxi key is configured to select a taxi travel mode.

Optionally, the controller is provided with an on-off key, a walk key and a conversation key;

wherein the on-off key is configured to switch on or switch off the intelligent blind guiding device; the walk key is configured to select a walking travel mode; and the conversation key is configured to select the wireless telephone function.

It can be seen from the above technical solutions that, the present disclosure provides an intelligent blind guiding device, which can realize a precise positioning by means of satellite positioning in combination with ultrasonic, enable the blind person to use walking, public traffic, taxi and any other navigation mode by inputting the destination information in a voice manner, combining with the public traffic information and the taxi information, and conveniently direct the blind person to travel by means of voice.

BRIEF DESCRIPTION OF THE DRAWINGS

In order to clearly explain the embodiments of the present disclosure, drawings used in the description of the embodiments will be briefly introduced below. Obviously, the drawings described below merely act as some embodiments of the present disclosure, other drawings may be obtained by the person skilled in the art based on these drawings, without creative effort.

In FIGS. 1-3: 1—satellite positioning module; 2—ultrasonic module; 3—positioning analysis module; 4—central processing unit; 5—prompt module; 6—voice input module; 7—public traffic information module; 8—taxi information module; 9—wireless communication module; 10—traffic status information module.

DETAILED DESCRIPTION OF PREFERRED EMBODIMENTS OF THE INVENTION

The technical solution of the embodiments of the present disclosure will be further described in detail below, in combination with the accompanying figures in the embodiments of the present disclosure. Obviously, the described embodiments are merely a part of all embodiments, rather than all of embodiments. Based on the embodiments of the present disclosure, all of the other embodiments obtained by the person skilled in the art without creative effort fall into the scope of the present disclosure.

Figure 1:
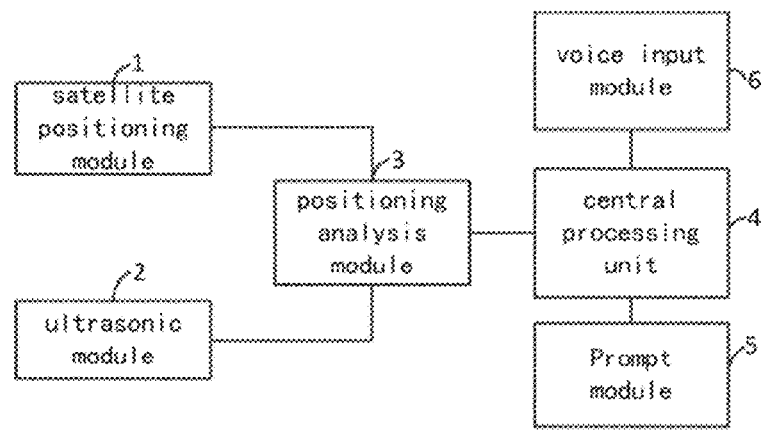
FIG. 1 is a schematic structural view of an intelligent blind guiding device according to an embodiment of the present disclosure.

FIG. 1 shows a schematic structural view of an intelligent blind guiding device according to an embodiment of the present disclosure. As shown in FIG. 1, the intelligent blind guiding device comprises a satellite positioning module 1, an ultrasonic module 2, a positioning analysis module 3, a central processing unit 4, a prompt module 5 and a voice input module 6.

In the intelligent blind guiding device, the satellite positioning module 1 is configured to acquire a location information representative of a user's location; the ultrasonic module 2 is configured to acquire an obstacle information by detecting surrounding obstacles; and the positioning analysis module 3 is configured to acquire a revised location information according to the location information, the obstacle information and a three-dimensional map stored therein.

In the intelligent blind guiding device, the voice input module 6 is configured to acquire a destination information according to an inputted voice; the central processing unit 4 is configured to determine a travel solution according to the revised location information and the destination information; and the prompt module 5 is configured to broadcast the travel solution.

The prompt module 5 may comprise a sound module for broadcasting the travel solution.

The satellite positioning module 1 may be GPS module, BEIDOU satellite positioning module, Galileo satellite positioning module, Glonass positioning module, or the like.

It can be seen that the present embodiment provides an intelligent blind guiding device, which realizes a precise positioning by means of the satellite positioning module 1 determining an approximate geographic location information of the user on the map, in combination with the ultrasonic module 2 determining the information of the obstacle surrounding the user. Further, the intelligent blind guiding device determines a travel solution according to the destination information inputted from the user in a voice manner and the precisely positioned location information, and conveniently directs the blind person to travel by means of voice.

Figure 2:
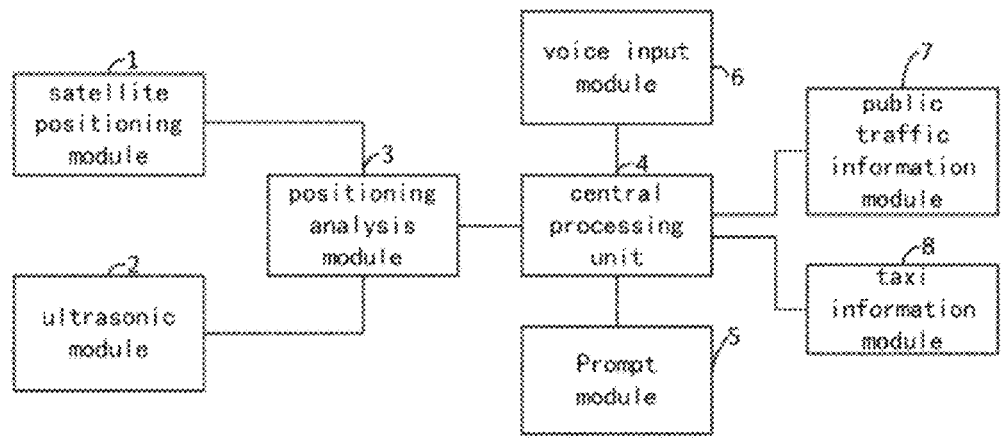
FIG. 2 is a schematic structural view of an intelligent blind guiding device according to an embodiment of the present disclosure.

FIG. 2 shows a schematic structural view of an intelligent blind guiding device according to an embodiment of the present disclosure. As shown in FIG. 2, the intelligent blind guiding device further comprises a public traffic information module 7, in addition to the satellite positioning module 1, the ultrasonic module 2, the positioning analysis module 3, the central processing unit 4, the prompt module 5 and the voice input module 6 in the above embodiment.

Specifically, the public traffic information module 7 is configured to acquire an arrival information of a public traffic, wherein the public traffic comprises a bus, a subway and the like.

Correspondingly, the central processing unit 4 is configured to determine a public traffic travel solution according to the revised location information, the destination information and the arrival information of the public traffic.

It will be appreciated that the prompt module 5 may be used for broadcasting the public traffic travel solution to the user.

Further, as shown in FIG. 2, the device further comprises a taxi information module 8.

Specifically, the taxi information module 8 is configured to acquire a taxi information within a preset range.

Correspondingly, the central processing unit 4 is configured to generate a request for taking a taxi and send the request to taxies within the preset range according to the revised location information, the destination information and the taxi information. As thus, if there is a taxi accepting the request, the prompt module 5 may broadcast the information regarding this taxi to the user.

It can be seen that the intelligent blind guiding device provided in the present embodiment enables the blind person to use walking, public traffic, taxi and various other travel navigation mode by precisely positioning and inputting the destination information in a voice manner, further combining with the public traffic information or the taxi information.

Figure 3:
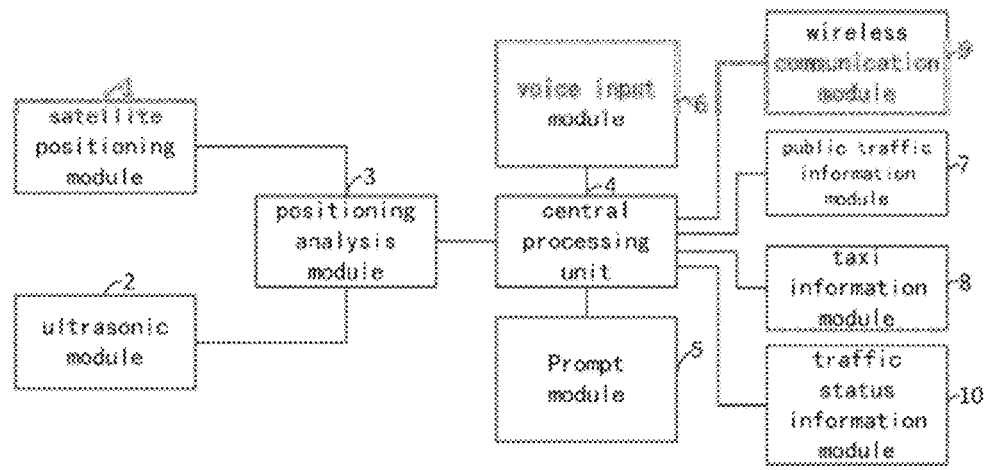
FIG. 3 is a schematic structural view of an intelligent blind guiding device according to an embodiment of the present disclosure.

FIG. 3 shows a schematic structural view of an intelligent blind guiding device according to an embodiment of the present disclosure. As shown in FIG. 3, the device further comprises a wireless communication module 9.

In the device, the wireless communication module 9 is configured to acquire an updated map information and send the map information to the central processing unit 4.

It will be appreciated that the central processing unit 4 updates the map information stored therein after receiving the map information.

Further, as shown in FIG. 3, the device further comprises a traffic status information module 10.

Specifically, the traffic status information module 10 is configured to acquire a real-time traffic status information and send the traffic status information to the central processing unit 4.

Correspondingly, the central processing unit 4 is configured to determine a travel route for the user according to the above map information and the traffic status information.

It can be seen that the intelligent blind guiding device in the present embodiment may update the map and traffic status information by the wireless communication module 9 and the traffic status information module 10, and direct the blind person to keep away from people intensive regions, so as to travel safely.

In the above embodiment, the prompt module 5 is further configured to prompt the user before encountering an obstacle. For example, the prompt module 5 may further comprise a vibration module. Before the user encounters an obstacle during walking, the vibration module may vibrate so as to prompt the user, or the sound module may broadcast to prompt the user.

Optionally, the device further comprises a conversation module.

The conversation module is configured to provide a wireless telephone function. As thus, the conversation module is further integrated in the intelligent blind guiding device, so that the user may contact and converse with other people by the conversation module.

Specifically, the ultrasonic module 2 in the above embodiment may comprise an ultrasonic emitter and an ultrasonic receiver.

By way of example, the intelligent blind guiding device in the above embodiment comprises a hat.

Figure 4:
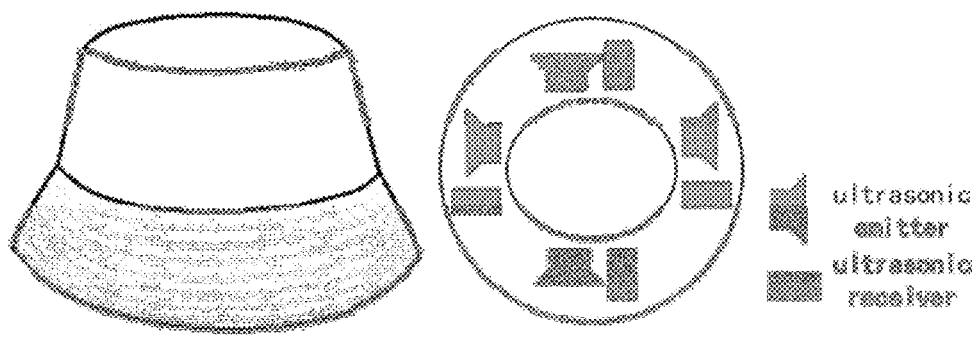
FIG. 4 is a hat integrated with an intelligent blind guiding device according to an embodiment of the present disclosure.

Specifically, the ultrasonic module 2 is provided on the hat. As shown in FIG. 4, one ultrasonic emitter and one ultrasonic receiver are provided on the hat in each of four directions, each two adjacent directions of which being spaced apart from each other by 90 degrees. As thus, the obstacle information in the four directions may be conveniently obtained by the blind guiding hat.

Figure 5:
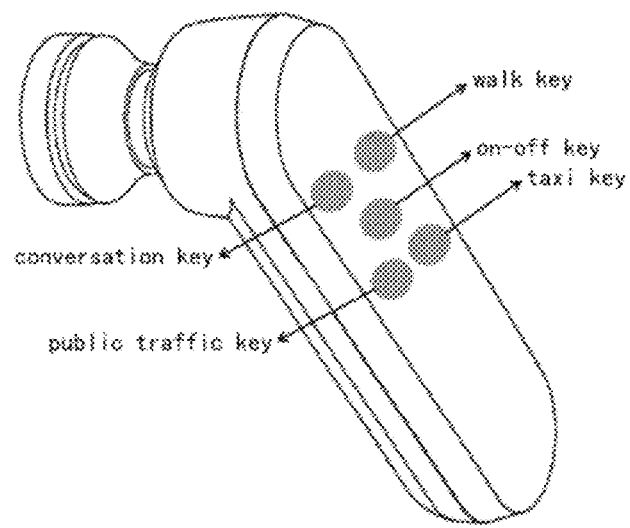
FIG. 5 is a controller integrated with an intelligent blind guiding device according to an embodiment of the present disclosure.

Further, the intelligent blind guiding device further comprises a controller. As shown in FIG. 5, the controller may be an earphone.

Specifically, the satellite positioning module 1, the positioning analysis module 3, the central processing unit 4, the prompt module 5, the voice input module 6, the public traffic information module 7, the taxi information module 8, the wireless communication module 9, the traffic status information module 10 and the conversation module in the above embodiment are each provided on the controller.

As shown in FIG. 5, a plurality of keys including an on-off key, a walk key, a public traffic key, a taxi key and a conversation key may be provided on the controller.

Specifically, the on-off key is configured to switch on or switch off the intelligent blind guiding device; and the walk key is configured to select a walking travel mode; the public traffic key is configured to select a public traffic travel mode; the taxi key is configured to select a taxi travel mode; and the conversation key is configured to select the wireless telephone function.

It should be noted that the above plurality of keys are identified with Braille, so as to enable the user to identify the functions of the keys.

It should be noted that the intelligent blind guiding device may also be provided on other wearable devices, which is not to be further described hereby.

It can be seen that the intelligent blind guiding device is provided on the hat, the controller, or any other wearable devices, thereby facilitating the wear of the user, furthermore, allowing the user to conveniently use a one-key function to switch on walking, bus, taxi or any other blind guiding modes. Further, based on the selected blind guiding mode from the user, the intelligent blind guiding device switches on voice identification function, satellite positioning and ultrasonic positioning functions. After a precise positioning is completed by the satellite positioning and ultrasonic positioning, the device automatically select a proper path to implement blind guiding, and switch on a voice blind guiding alert function and a vibration alert function, based on the destination information inputted by the user in a voice manner, the precise positioning information, together with the real-time traffic status, the public traffic information, the taxi information, and the like.

The above embodiments are only intended to explain the technical solutions of the present disclosure, but not to limit the present disclosure. Although the present disclosure is described in detail with reference to the above embodiments, it should be understood by the person skilled in the art that any modifications may be made to the technical solutions of the above various embodiments, or any equivalent substitutions may be made to some technical features thereof. Such modifications or substitutions fall into the spirit and scope of the technical solutions of various embodiments of the present disclosure.

What is claimed is:

1. An intelligent blind guiding device, comprising a satellite positioning module, an ultrasonic module, a positioning analysis module, a central processing unit, a prompt module and a voice input module;
wherein the satellite positioning module is configured to acquire a location information representative of a user's location; the ultrasonic module is configured to acquire an obstacle information by detecting surrounding obstacles; and the positioning analysis module is configured to acquire a revised location information according to the location information, the obstacle information and a three-dimensional map stored therein;
wherein the voice input module is configured to acquire a destination information according to an inputted voice; the central processing unit is configured to determine a travel solution according to the revised location information and the destination information; and the prompt module is configured to broadcast the travel solution,
wherein the device further comprises a wireless communication module; wherein the wireless communication module is configured to acquire an updated map information and send the map information to the central processing unit,
wherein the device further comprises a traffic status information module; wherein the traffic status information module is configured to acquire a real-time traffic status information and send the traffic status information to the central processing unit; and wherein the central processing unit is configured to determine a travel route for the user according to the map information and the traffic status information,
wherein the intelligent blind guiding device is configured to update the map and traffic status information by the wireless communication module and the traffic status information module, so as to direct a blind person to travel, and
wherein the intelligent blind guiding device comprises a hat.

2. The intelligent blind guiding device according to claim 1, wherein the device further comprises a public traffic information module;
wherein the public traffic information module is configured to acquire an arrival information of a public traffic; and
wherein the central processing unit is configured to determine a public traffic travel solution according to the revised location information, the destination information and the arrival information of the public traffic.

3. The intelligent blind guiding device according to claim 2, wherein the public traffic comprises a bus and a subway.

4. The intelligent blind guiding device according to claim 2, wherein the intelligent blind guiding device further comprises a controller;
wherein the satellite positioning module, the positioning analysis module, the central processing unit, the prompt module, the voice input module and the public traffic information module are each provided on the controller.

5. The intelligent blind guiding device according to claim 4, wherein the controller is provided with an on-off key, a walk key and a public traffic key;
wherein the on-off key is configured to switch on or switch off the intelligent blind guiding device; the walk key is configured to select a walking travel mode; and the public traffic key is configured to select a public traffic travel mode.

6. The intelligent blind guiding device according to claim 1, wherein the device further comprises a taxi information module;
wherein the taxi information module is configured to acquire a taxi information within a preset range; and
wherein the central processing unit is configured to generate a request for taking a taxi and send the request to taxies within the preset range according to the revised location information, the destination information and the taxi information.

7. The intelligent blind guiding device according to claim 6, wherein the intelligent blind guiding device further comprises a controller;
wherein the satellite positioning module, the positioning analysis module, the central processing unit, the prompt module, the voice input module and the taxi information module are each provided on the controller.

8. The intelligent blind guiding device according to claim 7, wherein the controller is provided with an on-off key, a walk key and a taxi key;
wherein the on-off key is configured to switch on or switch off the intelligent blind guiding device; the walk key is configured to select a walking travel mode; and the taxi key is configured to select a taxi travel mode.

9. The intelligent blind guiding device according to claim 1, wherein the prompt module is further configured to prompt the user before encountering an obstacle.

10. The intelligent blind guiding device according to claim 1, wherein the device further comprises a conversation module;
wherein the conversation module is configured to provide a wireless telephone function.

11. The intelligent blind guiding device according to claim 10, wherein the intelligent blind guiding device further comprises a controller;
wherein the satellite positioning module, the positioning analysis module, the central processing unit, the prompt module, the voice input module and the conversation module are each provided on the controller.

12. The intelligent blind guiding device according to claim 11, wherein the controller is provided with an on-off key, a walk key and a conversation key;
wherein the on-off key is configured to switch on or switch off the intelligent blind guiding device; the walk key is configured to select a walking travel mode; and the conversation key is configured to select the wireless telephone function.

13. The intelligent blind guiding device according to claim 1, wherein the ultrasonic module comprises an ultrasonic emitter and an ultrasonic receiver.

14. The intelligent blind guiding device according to claim 1,
wherein the ultrasonic module is provided on the hat; and one ultrasonic emitter and one ultrasonic receiver are provided on the hat in each of four directions, each two adjacent directions of which being spaced apart from each other by 90 degrees.

15. The intelligent blind guiding device according to claim 1, wherein the intelligent blind guiding device further comprises a controller;
wherein the satellite positioning module, the positioning analysis module, the central processing unit, the prompt module and the voice input module are each provided on the controller.

16. The intelligent blind guiding device according to claim 15, wherein the controller is provided with an on-off key and a walk key;
wherein the on-off key is configured to switch on or switch off the intelligent blind guiding device; and the walk key is configured to select a walking travel mode.

17. The intelligent blind guiding device according to claim 1, wherein the intelligent blind guiding device further comprises a controller;
wherein the satellite positioning module, the positioning analysis module, the central processing unit, the prompt module, the voice input module and the wireless communication module are each provided on the controller.

18. The intelligent blind guiding device according to claim 1, wherein the intelligent blind guiding device further comprises a controller;
wherein the satellite positioning module, the positioning analysis module, the central processing unit, the prompt module, the voice input module, the wireless communication module and the traffic status information module are each provided on the controller.

* * * * *